United States Patent [19]
Matsui

[11] Patent Number: 5,224,003
[45] Date of Patent: Jun. 29, 1993

[54] THIN-FILM MAGNETIC HEAD WITH LEAD ISOLATED FROM UPPER MAGNETIC BLOCK

[75] Inventor: Kiyoaki Matsui, Kumamoto, Japan

[73] Assignee: Matsushita Electric Industrial Co., Ltd., Osaka, Japan

[21] Appl. No.: 888,446

[22] Filed: May 28, 1992

Related U.S. Application Data

[63] Continuation-in-part of Ser. No. 371,747, Jun. 27, 1989, abandoned.

[30] Foreign Application Priority Data

Jun. 28, 1988 [JP] Japan .................................. 63-160007

[51] Int. Cl.⁵ .................................. G11B 5/147
[52] U.S. Cl. .................................. 360/126; 360/123
[58] Field of Search ............... 360/125, 126, 127, 123, 360/110

[56] References Cited

U.S. PATENT DOCUMENTS

| | | | |
|---|---|---|---|
| 4,800,454 | 1/1989 | Schwarz et al. | 360/123 X |
| 4,927,804 | 5/1990 | Zieren et al. | 360/126 X |
| 4,949,209 | 8/1990 | Imanaka et al. | 360/123 X |

Primary Examiner—Andrew L. Sniezek
Attorney, Agent, or Firm—Cushman, Darby & Cushman

[57] ABSTRACT

A thin film magnetic head which comprises a first magnetic block made of nonconductive magnetic material having an indented portion in a part thereof, a lead formed in the indented portion having a part thereof being covered with a first insulating material, a coil layer formed on the first magnetic block and connected to the lead at one end thereof and having a part which is arranged to overlap with the lead by way of the first insulating material, a second insulating material formed on an end portion of the first magnetic block at the side thereof facing a storage medium, and a second magnetic block connected onto the coil layer and the second insulating material.

2 Claims, 5 Drawing Sheets

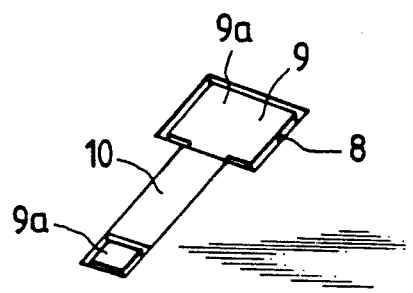
FIG. 4
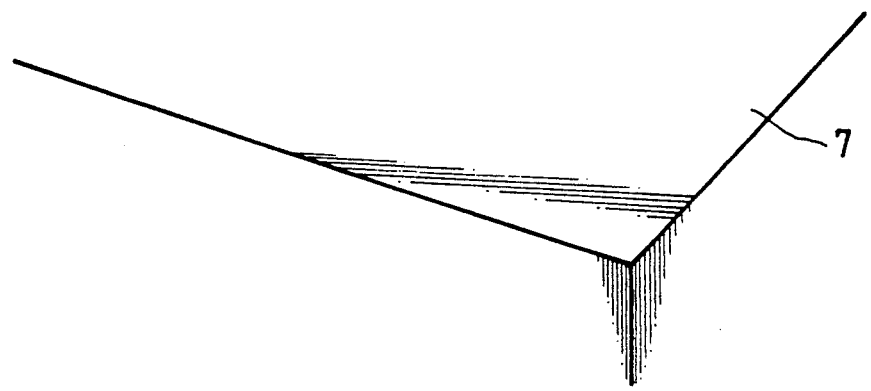
FIG. 5
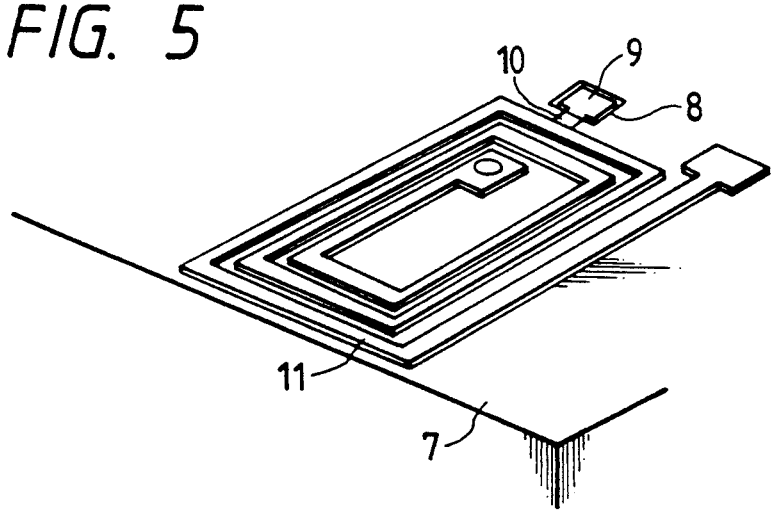

THIN-FILM MAGNETIC HEAD WITH LEAD ISOLATED FROM UPPER MAGNETIC BLOCK

This is a continuation-in-part (CIP) of application Ser. No. 07/371,747, filed on Jun. 27, 1989, which was abandoned.

BACKGROUND OF THE INVENTION

1. Field of the Invention

This invention generally relates to a magnetic head for use in a magnetic recording and reproducing apparatus, and more particularly to a thin film magnetic head for use in an analog magnetic recording and reproducing apparatus and a digital magnetic recording and reproducing apparatus.

2. Description of the Related Art

In recent years, a demand for larger memory capacity has sprung up. This demand has been met by increasing the track recording density of data recorded by a magnetic head. A thin film magnetic head has been devised and adapted for use as a magnetic head which satisfies theses high density requirements. A conventional thin film magnetic head, however, suffers from the fact that it must go through many processes, such as a a thin film production process, a photolithographic process and an etching process. Furthermore, an annealing process is necessary for stabilizing the crystal structure of the thin film. The special advantage associated with using the thin film technique cannot be fully utilized because a great number of thin film magnetic heads cannot be produced in large quantities.

Further, in recent years, there has been devised a thin film magnetic head having a multi-track structure for use in a magnetic recording and reproducing apparatus using a magnetic tape which is produced by first forming a coil layer on a magnetic substrate by use of the thin film technique, and then covering this coil layer with another ferrite substrate. In the case of the thin film magnetic head of this type, the coil layer is formed by a thin film. Thus, the width of a track can be substantially reduced. Further, because the thin film magnetic head has a simple structure, production thereof can be increased.

Hereinafter, this conventional thin film magnetic head will be explained by referring to FIGS. 6 and 7.

FIG. 6 is a sectional side view of the conventional thin film magnetic head. Further, FIG. 7 is a top view of the conventional thin film magnetic head of FIG. 6. In these figures, reference numeral 1 indicates a lower magnetic block made of nonconductive magnetic material. In the conventional thin film magnetic head, Ni-Zn ferrite is mainly employed as the nonconductive magnetic material. Further, reference numeral 2 indicates the coil layer formed on the lower magnetic block 1 in the following manner. First, a conductive film made of materials such as Cu and Au is formed on the lower magnetic block 1 by using a vapor deposition method or a sputtering method. Thereafter, the coil layer 2 is formed by forming the conductive film into a predetermined shape thereof by performing a method such as photolithography. At that time, there is provided a gap 6, of which the width is sufficient to contain a film made of gap filler therein, between an upper magnetic block 5 (to be described later) and the combination of the coil layer 2 and an insulating layer 3 (also to be described later). Furthermore, reference numeral 3 indicates an insulating layer formed on a part of the surface of the lower magnetic block 1 other than the part on which the coil layer 2 is formed. Further, the thickness of the insulating layer is arranged to be almost equal to that of the coil layer 2. This insulating layer 3 is made of an oxide such as $SiO_2$ or $Al_2O_3$ by using the sputtering method. Moreover, reference numeral 4 indicates a lead mounted don the insulating layer 3 in such a manner that it strides over the coil layer 2. Furthermore, another insulating layer 4a is provided between the lead 4 and the coil layer 2. Reference numeral 5 indicates an upper magnetic block connected to the coil layer 2 and the insulating layer 3 by an epoxy resin adhesive agent. In this upper magnetic block 5, a track limiting groove 5a for limiting the width of a track is formed as shown in FIG. 8 and this groove is filled with glass. Further, another groove 5b is bored in such a manner to extend in the direction perpendicular to the track limiting groove 5a and is also filled with glass. Also shown in FIG. 6 is storage medium 14. In the thus constructed thin film magnetic head, magnetic induction, which is represented by using magnetic lines of flux indicated by arrows shown in FIG. 6, is induced. Moreover, in the thus constructed thin film magnetic head, a magnetic layer is formed by the magnetic blocks in place of a thin film. Therefore this thin film magnetic head excels in productivity.

However, in the above described conventional thin film magnetic head, an end of the upper magnetic block 5 is placed as close as possible to the lead 4 and the upper magnetic block 5 is connected to the top surface of the coil layer 2 by the epoxy resin adhesive agent such that the upper magnetic block 5 does not overlap with the lead 4 and the magnetic flux generated in the coil layer 2 efficiently flows through the upper magnetic block 5 and the lower magnetic block 1. It is, however, difficult to conduct such an operation and thus this has caused difficulty in further increasing the productivity of the thin film magnetic head.

Further, in the insulating layer 4a provided on the coil layer 2 to insulate the lead 4 from the coil layer 2, a part of the insulating layer 4a corresponding to an edge portion of the coil layer 2 is extremely thin. Thus, the conventional thin film magnetic head has another drawback in that an insulation failure is apt to occur at that part thereof.

The present invention is accomplished to eliminate the above described defects of the conventional thin film magnetic head.

SUMMARY OF THE INVENTION

It is therefore an object of the present invention to provide a thin film magnetic head which can be provided with an upper magnetic block such that the upper magnetic block does not directly ride on a lead or touch the lead, whereby the upper magnetic block can be easily connected to the top surface of the coil layer so that work efficiency can be increased and whereby the insulation failure between the lead and the coil layer can be prevented.

To achieve the foregoing object and in accordance with a first aspect of the present invention, there is provided a thin film magnetic head which comprises a first magnetic block made of nonconductive magnetic material having a depressed portion in a part thereof, a lead being formed in the depressed portion of the first magnetic block and having a part covered with a first insulating material, a coil layer, part of which is formed on the first magnetic block and connected to the lead at one end thereof and having a part of the coil layer arranged to overlap with the lead by way of the first insulating material, second insulating material formed on an end portion of the first magnetic block at the side thereof facing a storage medium, and a second magnetic block connected onto both the coil layer and the gap layer.

In accordance with a second aspect of the present invention, there is provided a thin film magnetic head which comprises a first magnetic block being made of nonconductive magnetic material and having a depressed portion in a part thereof, a lead being formed in the depressed portion of the first magnetic block and such that a surface which is reverse to said first magnetic block having a part of the lead covered with insulating material such that the top surface thereof does not upwardly project from that of the part of the first magnetic block other than the depressed portion of the first magnetic block, a coil layer being formed on the first magnetic block and connected to a part of the lead uncovered with the insulating material at one end thereof and having a part of the coil layer arranged to overlap with the lead by way of the insulating material, a second insulating material formed on an end portion of the first magnetic block at the side thereof facing a storage medium, and a second magnetic block being connected onto both the coil layer and said second insulating material and covering over at least a part of a connection portion between the coil layer and the lead.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIGS. 2 thru 5 are fragmentary perspective diagrams for illustrating a fabrication process of the thin film magnetic head of FIG. 1;

DETAILED DESCRIPTION OF PREFERRED EMBODIMENT

Figure 1:
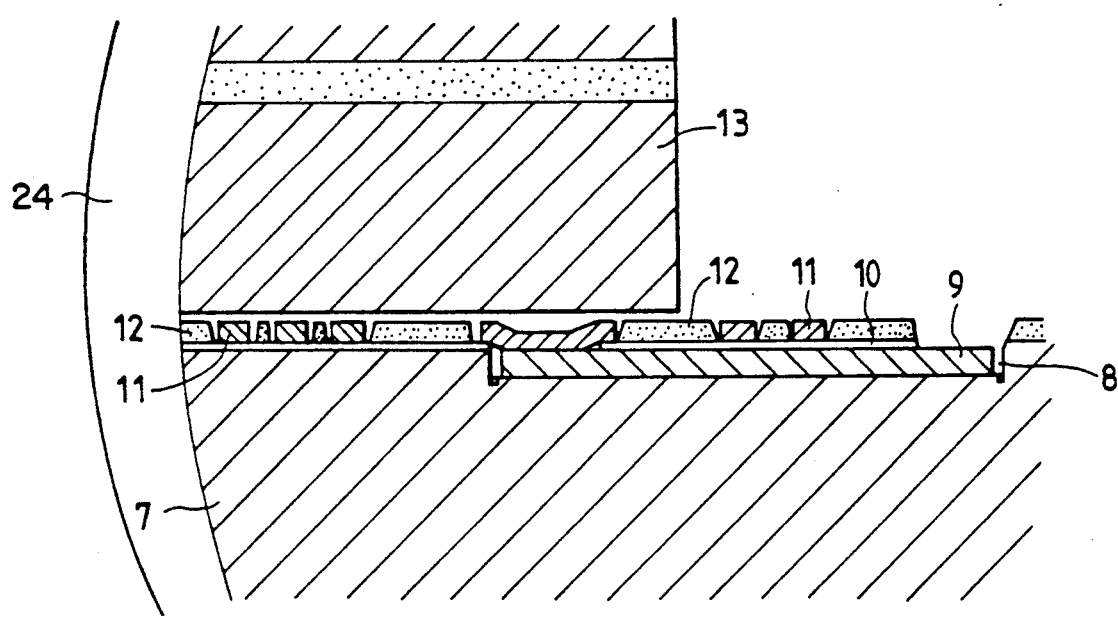
FIG. 1 is a sectional side view of a thin film magnetic head embodying the present invention.

FIG. 1 is a sectional side view of a thin film magnetic head embodying the present invention.

Figure 7:
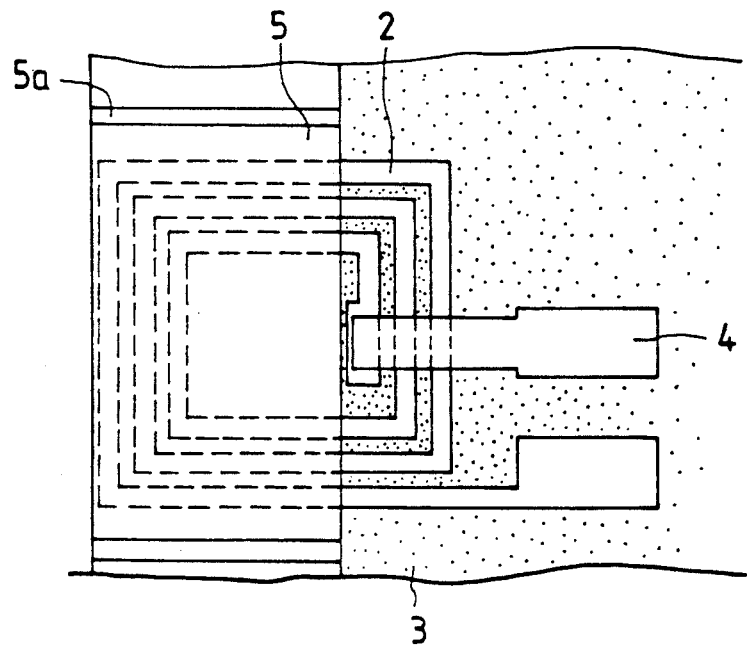
FIG. 7 is a top view of the conventional thin film magnetic head of FIG. 6.
Figure 8:
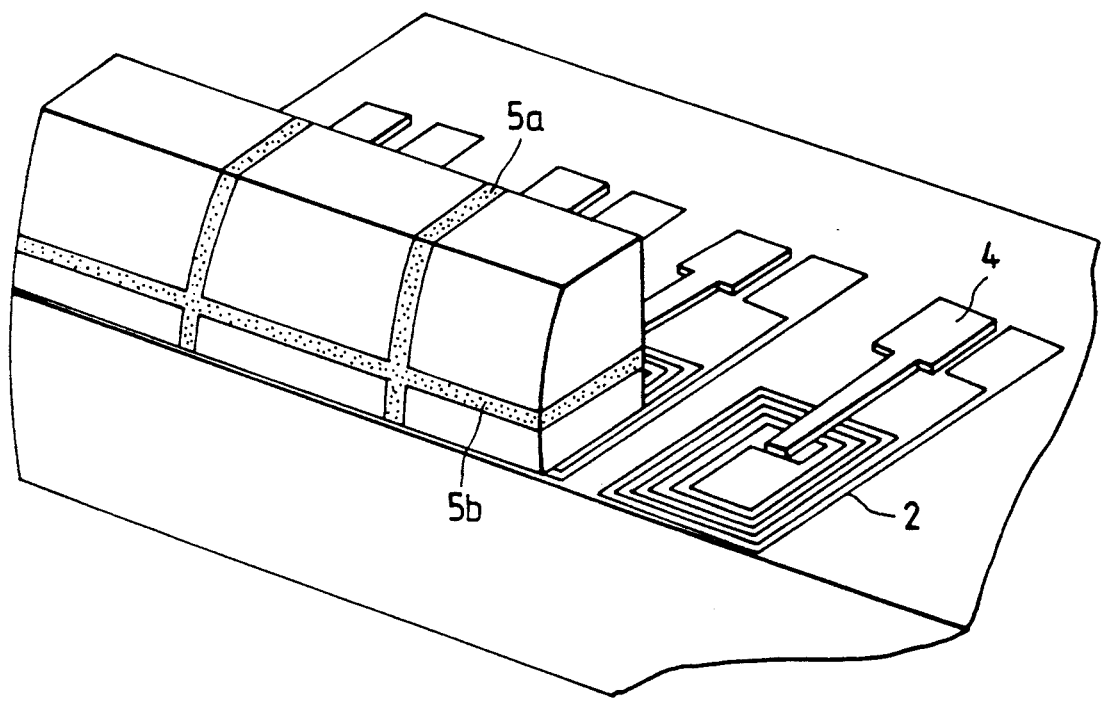
FIG. 8 is a perspective view of the conventional thin film magnetic head of FIG. 6.

In this figure, reference numeral 7 indicates a lower magnetic block made of nonconductive magnetic material; 8 is indented portion formed in one surface of the lower magnetic block; and 9 is a lead provided in the indented portion 8. The thickness of this lead 9 is smaller than the depth of the indented portion 8. Further, reference numeral 10 indicates an insulating layer formed in the lead 9 and covering a part thereof; and 11 indicates a coil layer of which one end is in contact with the lead 9. The part of the top surface of the coil layer is connected to the lead 9 is arranged in such a manner so as not to be higher than the other part of the top surface of the coil layer 11. Moreover, reference numeral 12 designates an insulating layer formed on a part of the lower magnetic block 7 other than the part thereof on which the coil layer 11 is formed. The thickness of the insulating layer 12 is arranged in such a manner so as to be nearly equal to that of the coil layer 11. Furthermore, reference numeral 13 denotes an upper magnetic block which is stuck onto both a part of the top surface of the coil layer 11 and a part of the top surface of the insulating layer 12 by an epoxy resin adhesive agent which forms a layer (hereinafter referred to as a gap layer) between the upper magnetic block and the combination of the coil layer 11 and the insulating layer 12. Additionally, a track limiting groove (which is similar to the groove 5a of FIG. 7) and another groove (which is similar to the groove 5b of FIG. 7) perpendicular to the track limiting groove are formed in the upper magnetic block 13, and these grooves are filled with glass. Further, reference numeral 24 indicates a storage medium Next, a fabrication process of the thus constructed thin film magnetic head embodying the present invention will be explained with reference to FIGS. 2 thru 4.

Figure 2:
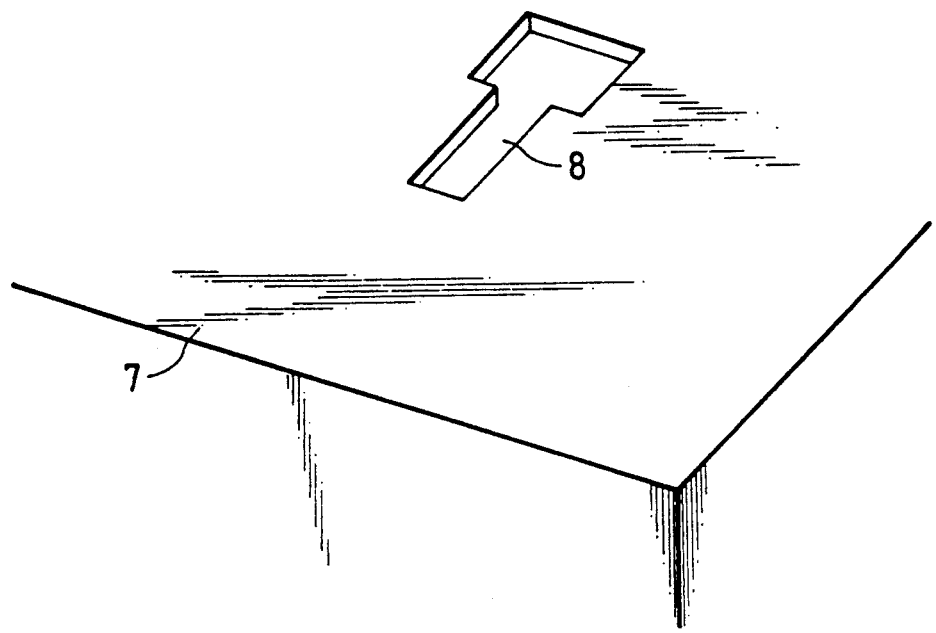

To begin with, the lower magnetic block 7 is formed by using the nonconductive magnetic material such as Ni-Zn ferrite. Further, as shown in FIG. 2, the indented portion 8 having a depth of a predetermined value is formed in a surface of the lower magnetic block 7 by using an ion-assisted etching method.

Figure 3:
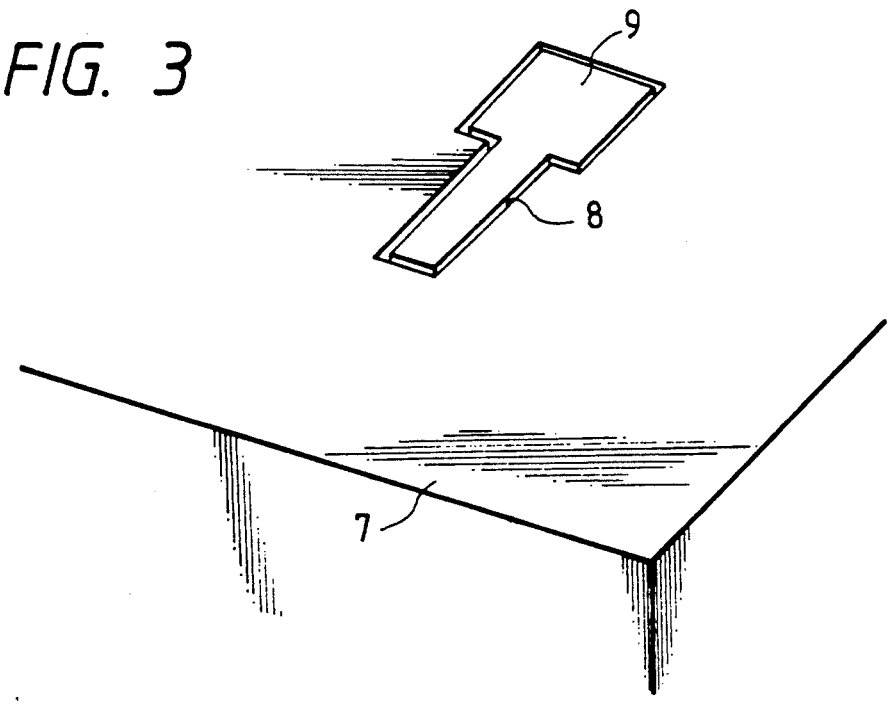
Figure 6:
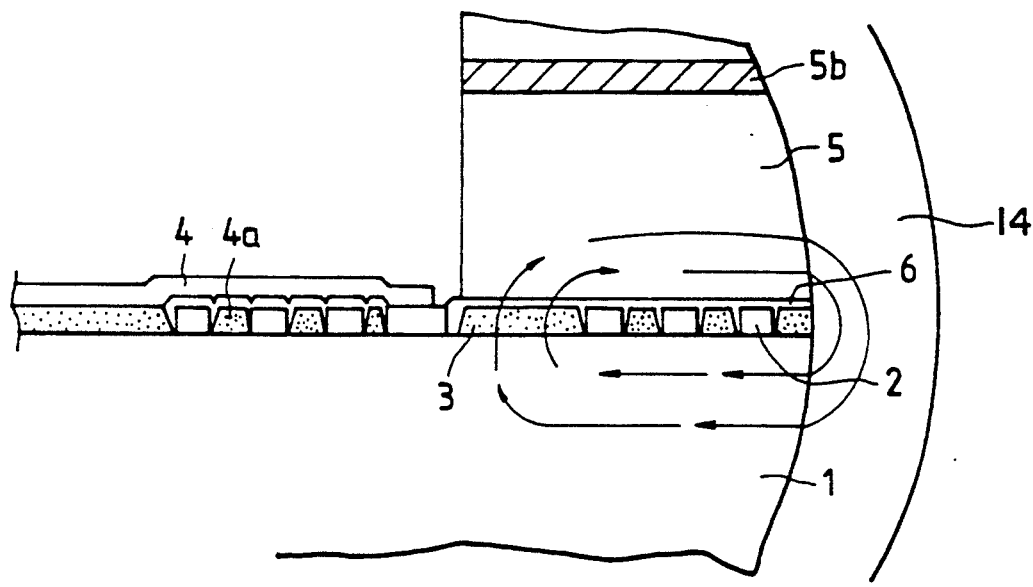
FIG. 6 is a sectional side view of a conventional thin film magnetic head.

Subsequently, as shown in FIG. 3, a conductive film is formed by depositing metals such as Au, Al and Cu to the inside surface of the indented portion 8 and then forming the lead 9 by putting the conductive film into a predetermined shape thereof by using, for example, the photolithography method. Thereafter, as shown in FIG. 4, the insulating layer 10 is formed by depositing compounds such as $SiO_2$ and $Al_2O_3$ on a part of the lead 9 other than the part 9a thereof, which is to be connected to the coil layer 11, and the part 9b thereof, which is to be connected to an external device by a wire bonding method. Then, as shown in FIG. 5, the coil layer 11 is formed on the lower magnetic block 7 in the following process. First, a conductive film made of metals such as Au, Al and Cu is formed on the lower magnetic block 7 by using, for example, a sputtering method. Further, this conductive film is put by the photolithography method into a predetermined shape thereof. Moreover, an end portion of the conductive film is connected to an external device by the wire bonding method. Next, the insulating layer 12 made of the compounds such as $SiO_2$ and $Al_2O_3$ are formed on the part of the lower magnetic block 7 on which the coil layer 11 is not formed. Finally, the upper magnetic block 13 is stuck onto both a part of the top surface of the coil layer 11 and a part of the top surface of the insulating layer 12 by the epoxy resin adhesive agent (that is, the gap layer). Further, the surface of the thin film magnetic head facing storage medium 24 is polished and formed into a predetermined shape thereof. Thus, the fabrication process of the thin film magnetic head is completed.

As described above, in this embodiment, the lead 9 is provided in the indented portion 8 of the lower magnetic block 7 such that the top surface of the coil layer 11 formed directly on the lead 9 is no higher than the highest surface of the other parts of the coil layer 11. Thus, there is no fear that the upper magnetic block 13 directly will ride on or touch the lead 9 at the time of providing the block 13 to the thin film magnetic head of the present invention. Further, the upper magnetic block 13 can be easily provided to the thin film magnetic head and thereby the work of fabricating the thin film magnetic head can be simplified. As a consequence, production of the thin film magnetic head can be substantially simplified. Furthermore, the thickness of every part of the film or insulating layer 10 intervening between the coil layer 11 and the lead 9 can be almost constant. As a result, the thin film magnetic head of the present invention can have preferable insulation characteristics.

While a preferred embodiment of the present invention has been described above, it is to be understood that the present invention is not limited thereto, and that other modifications will be apparent to those skilled in the art without departing from the spirit of the invention. The scope of the present invention, therefore, is to be determined solely by the appended claims.

What is claimed is:

1. A thin film magnetic head for use in a magnetic recording/reproducing apparatus, said magnetic head comprising:
    a first magnetic block made of non-conductive magnetic material and having an indented portion of a predetermined depth and a non-indented portion;
    a lead provided in said indented portion, said lead having first and second surfaces opposite to each other, the first surface of said lead being not in contact with said first magnetic block, the second surface of said lead being in contact with said first magnetic block at said indented portion thereof, the first surface of said lead having first and second sections, the first section of the first surface of said lead being covered with a first insulating material, the second section of the first surface of said lead not being covered with an insulating material;
    a coil layer having a first part formed on said non-indented portion, a second part in contact with the second section of the first surface of said lead, and a third part covering said first insulating material;
    a second insulating material formed on one end of said non-indented portion and adjacent to a storage medium; and
    a second magnetic block provided adjacent to said storage medium, said second magnetic block being apart from said lead, said first insulating material, said coil layer and said second insulating material.

2. The thin film magnetic head as set forth in claim 1, wherein:
    said second part of said coil layer has first and second surfaces opposite to each other, the first surface of said second part of said coil layer being in contact with the second section of the first surface of said lead, the second surface of said second part of said coil layer being indented relative to a surface of each of said first and third parts of said coil layer; and
    said second magnetic block covers at least a part of said second part of said coil layer in such a manner as not to contact said second part of said coil layer.

* * * * *